March 6, 1934.  F. HOLMES  1,949,743
APPARATUS FOR TESTING METERS
Filed Dec. 29, 1930
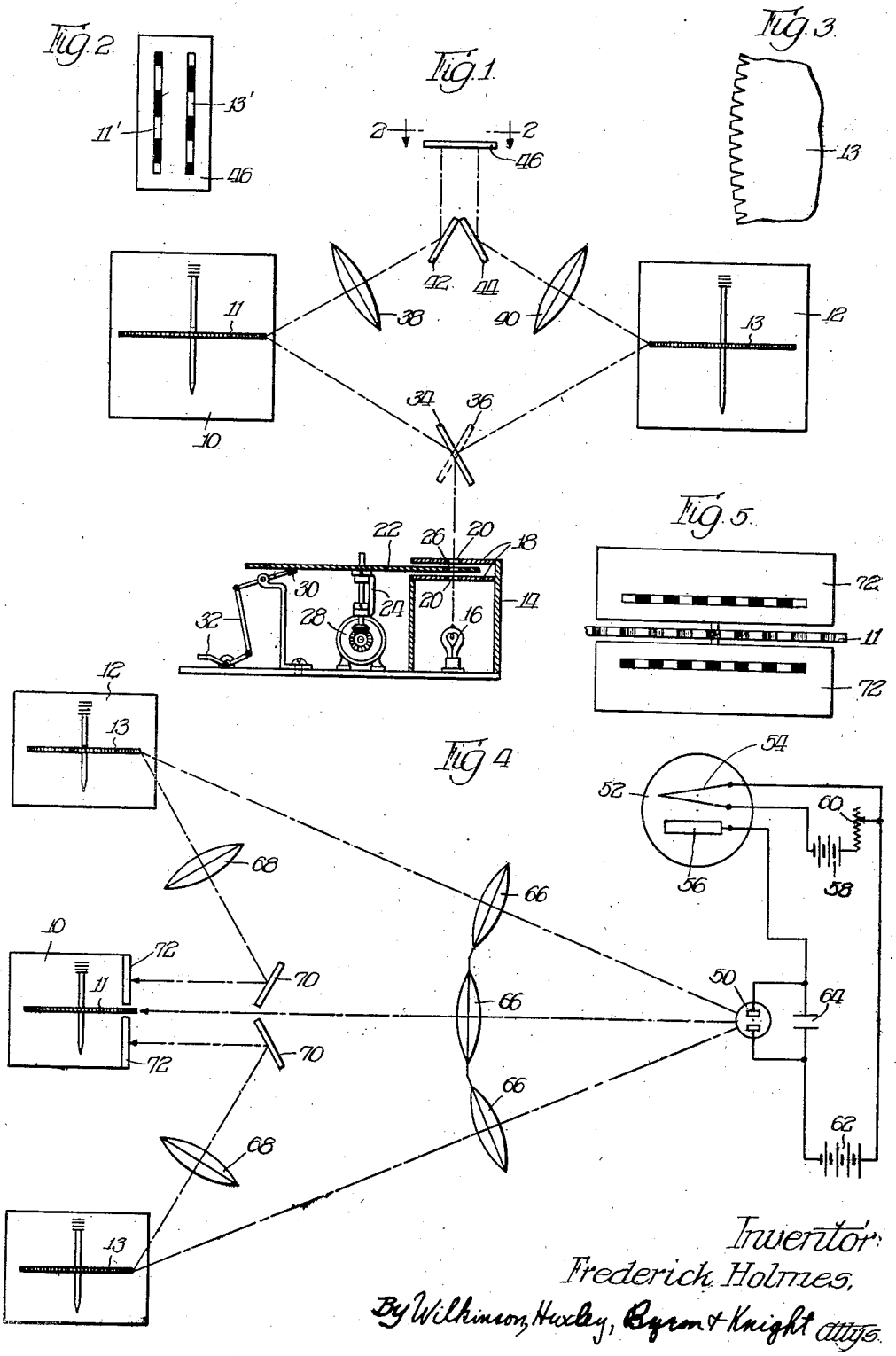
Inventor:
Frederick Holmes,
By Wilkinson, Huxley, Byron & Knight Attys.

Patented Mar. 6, 1934

1,949,743

UNITED STATES PATENT OFFICE 1,949,743

APPARATUS FOR TESTING METERS

Frederick Holmes, La Fayette, Ind., assignor to Duncan Electric Manufacturing Co., La Fayette, Ind., a corporation of Illinois Application December 29, 1930, Serial No. 505,454

3 Claims. (Cl. 88—14)

This invention relates to the stroboscopic testing of electric meters. In its illustrated form it includes the simultaneous stroboscopic observation of both the meter or meters to be tested and the standard meter, it being merely necessary that the images of the discs move at the same rate rather than that either of the images be made absolutely stationary. The apparatus of the invention includes in combination with the meters, the discs of which are suitably serrated or marked, a stroboscopic arrangement whereby light is flashed periodically on the discs and reflected by them through suitable lenses to an observer or onto a screen such that the images are seen adjacent to and parallel with each other, or parallel with and adjacent to one of the discs which is also illuminated periodically by the stroboscopic apparatus.

One object of the invention is to provide a cheaper, more convenient and more practical apparatus for testing meters than has heretofore been known. In both of the illustrated forms of my invention the comparison between the meters is made by comparing the apparent or stroboscopic movement of the discs, without the necessity of accurately timing the frequency of the flashes of light. It is necessary now only that the stroboscopic image of the meter being tested and the stroboscopic image of the standard meter show the same movement. This also makes it unnecessary that the current flowing through the two transformers remain exactly constant since any variation will effect both meters equally. In its preferred form, by invention uses a beam of light of sufficient intensity to illuminate the discs so brightly that the stroboscopic effect may be procured even when the outside light conditions are fairly good.

With these and various other objects in view, the invention may consist of certain novel features of construction and operation, as will be more fully described and particularly pointed out in the specification, drawing and claims appended hereto.

In the drawing, which illustrates an embodiment of the device, and wherein like reference characters are used to designate like parts, Figure 1 is a diagrammatic view illustrating the preferred form of my invention;

Figure 2 is a view showing the images as they might appear on the screen of Figure 1; taken along the line 2—2;

Figure 3 is a fragmentary view showing the shape of the edges of the meter discs;

Figure 4 is a diagrammatic view illustrating a second form of my invention; and

Figure 5 is a view showing the appearance of the stroboscopic images as seen in using the apparatus of Figure 4.

Although the invention may take many forms, only two of these have been illustrated. The standard meter in each form is designated 10 and its disc is designated by the numeral 11. The meters to be tested are designated by the numeral 12 and their discs by the numerals 13. In the preferred form of my invention each of the discs 11 and 13 are illuminated by the stroboscopic illuminating apparatus 14. This apparatus comprises an ordinary electric lamp 16, preferably illuminated by direct current and having its light shielded from the meters by a housing 18, except as the light is permitted to shine through the apertures 20. The apertures 20 are preferably in alignment in two spaced and parallel walls of the housing 18. A stroboscopic disc 22 is mounted in a suitable bearing 24 in such a position that the disc extends between the apertures 20. The disc 22 is provided with a ring of apertures 26 which pass in alignment with the apertures 20 so that when the three apertures are in alignment light may pass from the lamp 16 to the meter discs. The disc 22 is rotated by a small preferably non-synchronous motor 28 and its rotation may be controlled by any suitable means such as by the felt brake 30 which may be controlled by a suitable system of levers 32 to be operated by hand or otherwise.

The beam of light which shines through the apertures 20 and 26 strikes a pair of mirrors 34 and 36 which are preferably adjustable. The mirror 34 directs the portion of the beam striking it to shine on the standard meter disk 11. The mirror 36 directs the portion of the bottom of the light which strikes it to the disk 13 of the meter being tested. If desired, a lens may be used to concentrate the light upon these discs although by using a sufficiently bright lamp 16 such concentration is not necessary. Lenses 38 and 40 are provided to converge the rays of light reflected from the meter discs 11 and 13 respectively. These rays are reflected by mirrors 42 and 44 respectively on to the screen 46, or into the eye of the observer through a telescope or not as preferred. When the screen 46 is used the images 11′ and 13′ appear thereon whenever the light flashes through the stroboscopic disc 22. As is well known in the art of stroboscopes, the motion of a stroboscopic image such as the images 11′ and 13′ may be controlled by the frequency of the flashes of light. According to this invention the motions of the two images are simultaneously and equally controlled so that if the two discs are rotating at the same speed the two images will also appear to move at the same speed if at all.

According to this invention it is not necessary that the images be stopped, but merely that they be slowed down sufficiently for the observer to be sure that they are moving at the same speed. For the purpose of so controlling the speeds of the images the felt brake 30 is provided, and in addition there may be provided a rheostat or other control means for the meter 28.

One of the advantages of this invention is that it is not necessary that the control means be either delicate or uniform, since whatever inaccuracy of control there may be will effect both of the meters equally, and therefore will not alter their comparative speed relations.

In the apparatus shown in Figure 4 a different type of illumination has been used, the light coming from a flickering tube 50. The circuit for this tube, together with its parts are illustrated diagrammatically in Figure 4, though any means for producing a flickering light may be used. It includes a two element vacuum tube 52 having a filament 54 and a plate 56. The filament 54 is heated by a battery 58 and controlled by rheostat 60. The plate circuit is energized by the battery 62 which should be about 200 volts with its negative terminal of course connected to the filament. A Raytheon tube, or any brightly luminous gas-filled tube 50 and a condenser 64 which may be variable if desired are connected in parallel in the plate circuit between the plate and the positive poles of the battery. If desired, a resistance may be inserted in series with the battery 62 or just in series with the tube 50. This circuit sets up an oscillation which lights the tube 50 with a flickering illumination the frequency of which may be regulated or terminated by the capacity of the condenser 64 and by the intensity of heat of the filament 54 of the vacuum tube 52.

As the illumination of the tube 50 is not especially bright, lenses 66 are provided which focus the light from the tube onto the various discs 13 of the meters being tested, and the disc 11 of the standard meter. Additional lenses 68 and mirrors 70 are provided for focusing images of the discs 13 on the screens 72 adjacent the standard meter disc 11. As illustrated in Figure 5, this brings to view the three stroboscopic images of the three discs side by side so that their motion may be readily compared. Although the disc 11 is actually seen directly, the view obtained of it under the stroboscopic illumination is for convenience called an image, since the view is intermittent and the motion appears to be slowed down just as in the case of the actual images.

Operation

The meter to be tested and the standard meter are subjected to identical current influences, as by connecting their potential windings in parallel and their current windings in series. The stroboscopic light is focused on the discs and the images focussed on the screens. The frequency of the light flashes is regulated to correspond approximately with the frequency with which the notches in the meter discs pass a given point, or a simple fraction of that frequency. This adjustment is made in the apparatus of Figure 1 either by regulating the rheostat of the meter 28, or by applying the felt brake 30 to the disc 32. In the apparatus of Figure 4 adjustment is made either by regulation of the rheostat 60 or by regulation of the condenser 64. When this adjustment has been made the images of the discs appear stationary or appear to move slowly depending on the exact adjustment of the frequency of the flashes. It is immaterial which of these conditions exist. If the apparent motion of the image of the disc of the meter being tested corresponds to the apparent motion of the standard meter disc, then the meter being tested is satisfactory. If the motions vary, then the meter being tested is adjusted until the apparent motions are the same. It should be understood, of course, that adjusting the meters until their apparent motions are the same is merely a convenient way of adjusting them until the discs actually rotate at the same speed. Before being tested in this manner, the meters are nearly enough correct so that there is no danger of one disc rotating sufficiently faster than the other to have its image appear to move the same as the image of the standard in spite of a difference of motion of the discs.

As pointed out previously, this apparatus for testing has the advantage over previous types of apparatus, in that it is not necessary that the current to which the meters are subjected remain absolutely constant, since the testing meter is subjected to the same current as is the tested meter, however, the current may vary. It is not necessary that the frequency of the flashes have any exact relation to the speed of rotation of the discs since any varying movement due to the lack of exactness will be the same in both meters. This lack of the necessity for exactness permits the use of a simple apparatus with a strong light tending for greater convenience and economy in operation, as shown in the preferred apparatus of Figure 1.

It is to be understood that I do not wish to be limited by the exact embodiments of the device shown, which are merely by way of illustration and not limitation, as various and other forms of the device will of course be apparent to those skilled in the art without departure from the spirit of the invention or the scope of the claims.

I claim:

1. Apparatus for stroboscopically comparing the speed of rotation of meter discs having spaced markings thereon, which comprises means for periodically illuminating said discs and means for making said discs appear adjacent one another so that their motions may be easily compared, in which the means for illuminating said discs comprises a strong source of substantially constant illumination, mechanical means for obstructing the illumination and periodically unobstructing it, and means for roughly regulating the speed of said mechanical obstructing means.

2. Apparatus for stroboscopically comparing the speed of rotation of meter discs having spaced markings thereon, which comprises means for periodically illuminating said discs and means for making said discs appear adjacent one another so that their motions may be easily compared, in which the means for illuminating said discs comprises a strong source of substantially constant illumination, mechanical means for obstructing the illumination and periodically unobstructing it, and means for roughly regulating the speed of said mechanical obstructing means, the effectiveness of said last named means being controlled simply by the force exerted thereon by the operator.

3. Apparatus for stroboscopically comparing the speed of rotation of meter discs having spaced marking thereon, which comprises means for periodically illuminating said discs and means for making said discs appear as if adjacent one another so that their motions may be easily compared, in which the means for illuminating said discs comprises a strong source of substantially constant illumination, a rotating stroboscope disc having circumferentially spaced holes therein through which the light may intermittently pass, and means operable substantially instantaneously to roughly regulate the speed of said stroboscope disc.

FREDERICK HOLMES.